United States Patent Office 3,287,332
Patented Nov. 22, 1966

3,287,332
METHOD FOR THE PRODUCTION OF
PETROLEUM RESIN
Osamu Saeki, Niihama-shi, Tameo Wakamatsu, Nishinomiya-shi, and Shinsaku Moriwaki, Toyonaka-shi, Japan, assignors to Sumitomo Chemical Company, Ltd., Osaka, Japan, a corporation of Japan
No Drawing. Filed Sept. 6, 1962, Ser. No. 221,859
Claims priority, application Japan, Sept. 9, 1961, 36/33,009
3 Claims. (Cl. 260—82)

This invention relates to a method for the production of petroleum resin from liquid hydrocarbon mixtures containing unsaturated hydrocarbons. More particularly, it relates to a method for the production of petroleum resin from liquid hydrocarbon mixtures containing olefins and diolefins, including cyclodienes such as cyclopentadiene.

It is well known that petroleum resin is produced by polymerization employing a Friedel-Crafts catalyst such as aluminum chloride, aluminum bromide and boron trifluoride, from a certain fraction of petroleum which contains olefins and diolefins (for example, Japanese patent publication No. 5,442/1959). However the produced resin is colored, according to the kind of the starting materials and the reaction conditions, from light amber to dark brown. Thus the starting materials and polymerization conditions are limited, if one desires to obtain a resin which has a pale color and a high softening point. For example, if a hydrocarbon mixture ($C_5$–280° C. fraction), which is obtained by steam cracking of naphtha, kerosene and gas-oil etc., and contains more than 2% (wt.) of cyclopentadiene, is employed as the starting materials, gel is formed in the mixture at the beginning of polymerization. The gel suspended in the reaction products deleteriously affects the following operations such as the removal of catalyst by washing after the reaction.

Thus, in said publication, a method is proposed which comprises subjecting said fraction ($C_5$–280° C. fraction) to a heat-treatment at 90° to 140° C. for 6 to 9 hours to convert cyclopentadiene monomer to dimer, separating the dimer as bottom product by steam or vacuum distillation of the fraction, polymerizing the top fraction of the distillation (containing less than 2% of cyclopentadiene) with 10 to 50% (wt.) of aluminum chloride as catalyst at 10 to 60° C.

In order to remove catalyst from the reaction mixture, the mixture is hydrolyzed by contacting the same with water in liquid phase kept at around 100 to 200° C. If a temperature below 100° C. is employed in such a case, an emulsion is formed which makes the operation difficult, therefore the hydrolysis must be carried out at a temperature above 100° C. Then the hydrolyzed mixture is subjected to stripping in the presence of ammonia, and the unreacted hydrocarbon fraction and a light colored low-ash resin which has a softening point [1] of 90 to 96° C., and Gardner color [2] of 2, are obtained.

[1] Ball and ring method; ASTM 2S-51-T.
[2] Measured as a solution of 1 g. of resin dissolved in 67 ml. of xylene.

As seen from the above descriptions, the conventional methods are disadvantageous in that a process for preliminarily removing cyclodienes such as cyclopentadiene is necessary, and that water at a temperature of more than 100° C. is to be employed for the hydrolysis.

It is also well known that cyclopentadiene is polymerized by any one of the following catalysts, i.e. boron trifluoride, titanium tetrachloride, arsenic trichloride, antimony trichloride, antimony pentachloride, bismuth trichloride, iron chloride, iron bromide, tin chloride, etc. However, the primary result of these catalysts is to obtain an elastic rubber and not a resinous matter. Also, it is difficult to obtain a petroleum resin of a considerable molecular weight, if tin chloride alone is employed as the polymerization catalyst.

Accordingly, an object of the present invention is to provide a novel method for the production of petroleum resin by use of a novel combination of catalysts. Another object of the invention is to provide a novel method for the production of petroleum resin using a hydrocarbon mixture containing olefins and diolefins, without employing preliminary removal of cyclodienes. Still another object is to provide a novel method for the production of petroleum resin in superior yield to those in the conventional cases. Yet another object of the invention is to provide novel petroleum resins which have lighter color and higher iodine value. Other objects will be apparent from the description which follows.

In order to obviate the afore-mentioned defects in the conventional methods and to accomplish the above objects, the present invention employs two catalyst systems, namely, at least one of tetrachlorides of metals in Group 4 of the Periodic Table and an aluminum halide. Accordingly, the present invention is concerned with a method for the production of petroleum resin which comprises polymerizing preliminarily unsaturated hydrocarbons mainly composed of cyclodiene hydrocarbons by contacting a petroleum fraction which contains unsaturated hydrocarbons having not less than 4 carbon atoms and cyclodiene hydrocarbons and has a boiling point below 300° C., with a catalytic quantity of at least one of the tetrachlorides of metals in Group 4 of the Periodic Table, then polymerizing the unsaturated hydrocarbons by contacting the reaction product with a catalytic quantity of an aluminum halide, and separating the produced polymer from the reaction product.

More particularly, a petroleum fraction containing unsaturated hydrocarbons having not less than 4 carbon atoms and cyclodienes is supplied as the starting material to a reaction zone without any pretreatment. Then, the first catalyst, i.e. at least one of the tetrachlorides of metals in Group 4 is added to the reaction zone and the reaction mixture is well agitated at a certain temperature for a certain time, whereby a pre-polymer mainly composed of cyclodienes is formed in the fraction. Thereafter, the second catalyst, i.e. an aluminum halide is added to the reaction mass and the mixture is further agitated at a certain temperature for a certain time, whereby a petroleum resin of copolymer of olefins and diolefins with cyclodienes is formed. The reaction mass is washed with water and/or an aqueous alkaline solution, for example, an aqueous solution of sodium hydroxide, potassium hydroxide, sodium carbonate, and ammonia. Then, the reaction mass is subjected to stripping, preferably by steam or vacuum distillation to remove the unreacted hydrocarbons. Thus, a light amber colored petroleum resin having Gardner color of 1 or 2 is obtained as the residue. Of course, this method may be modified in various ways, for example in continuous or semi-continuous process, as easily understood for those skilled in the art.

In the method of the present invention, the amount of cyclodienes such as cyclopentadiene contained in the starting hydrocarbons is of no significance, and accordingly it is not necessary to remove cyclopentadiene preliminarily, since little or no gel is formed in the present method. Thus, as compared with the conventional ones, the processes and the apparatus are simplified. The present invention has also such advantage that the diene compounds which are apt to form gel are copolymerized with other unsaturated hydrocarbons to produce petroleum resin, thus the yield being increased by the amount almost corresponding to the gel in the conventional method.

In the present invention, further, the catalysts used are removed from the resinous product at a temperature below 100° C. without formation of emulsion. The reason why such emulsion is not formed at a temperature below 100° C. is not yet clear, but it seems that this is due to the characteristics of the petroleum resin obtained according to the present invention. As the starting materials for the production of the petroleum resin, various petroleum fractions containing unsaturated hydrocarbons such as olefins and diolefins including cyclodienes are used. Most advantageously the products obtained by steam-cracking of a petroleum fraction such as naphtha, kerosene and gas-oil are employed. In general, such petroleum fractions as naphtha, kerosene and gas-oil are cracked at 500°–1000° C. under a comparatively low pressure in the presence of steam for a short period of time. The cracked product obtained in such manner contains a large quantity of olefins, diolefins including cyclodienes, aromatics and some paraffins. From such product, hydrocarbons having 3 or less carbon atoms are removed by a continuous fractional distillation, and the remainder of the fractions comprising hydrocarbons of not less than 4 carbon atoms and having boiling points below 300° C. are used for the production of the petroleum resin.

The tetrachlorides of metals in Group 4 of the Periodic Table in the present invention may be employed either singly or as a mixture. Tetrahalides of titanium, germanium, zirconium, tin and hafnium are suitable for this purpose, and tin and titanium tetrachlorides are the most suitable. They may be used either in the form of liquid or solid as it was, or a solution (including a solution of them in a complex form), for example, in benzene, toluene, xylene, or naphtha. As the aluminum halides, aluminum chloride, bromide, fluoride, and iodide may be used. They may be used either in the form of solid, or a dispersion or solution (including a dispersion or solution of them in a complex form), in benzene, toluene, xylene, naphtha, or other hydrocarbons. Conveniently, both catalysts are employed in general in the form of a solution. These catalysts should naturally be anhydrous. These catalysts can be used in various ratios to the starting unsaturated hydrocarbon mixture, but it is practical to use amounts of 0.005–2.0% (wt.) of tetrachloride of metal in Group 4 and 0.5–2.0% (wt.) of aluminum halide. Polymerization temperature may cover a wide range, but a temperature of −40° C. to 70° C., more particularly 0° C. to 40° C., is preferred.

The period of time for the polymerization varies over a wide range. Upon addition of the first catalyst, i.e. the tetrachloride of metal in Group 4, the polymerization of cyclodienes starts immediately and completes within a few minutes to about 30 minutes, more particularly 5 to 10 minutes. Thereafter, the second catalyst, i.e. an aluminum halide is added to the reaction mass, whereby the main polymerization starts and completes within about 10 minutes to several hours, more particularly about 30 minutes to about 1 hour.

If desired, the petroleum resin product is treated or washed with a chelating agent solution, after the washing with water and/or an aqueous alkaline solution, for removal of any catalyst metal remaining in the product. The chelating agent which may be used for the washing of the reaction product, include ethylenediaminetetracetic acid, oxalic acid, nitrilotriacetic acid, citric acid, tartaric acid, etc.

The petroleum resin produced according to the present invention has a lighter color than those produced by the conventional methods. Besides, the petroleum resin contains, in its molecule, diolefins including cyclodienes in copolymerized state. Thus, the resulting product has a higher iodine value than those of the conventional ones. For example, the resins produced by the conventional methods have iodine value of 30 to 50, while the resin of the present invention has an iodine value of higher than 60, or sometimes higher than 70. This characteristic is particularly advantageous when the resin is used for paints and varnishes, or, after modification, as sizing agent for papers.

The present invention will be explained more particularly with reference to the following examples, but these examples are given only as illustrative and not as limitative. All parts and percentages referred to in the examples are by weight.

*Example 1*

A distillate, obtained from a steam cracking product, having boiling point of 40–180° C. and containing about 15% of conjugated acyclic olefins, 6% of cyclopentadiene, 29% of olefins, 30% of aromatics and 20% of paraffins, is used as the starting material. To 300 parts of this distillate, 3 parts of tin tetrachloride are added under efficient stirring in a period of about 5 minutes at 10–15° C. Then, to the resultant mixture, 3 parts of powdered anhydrous aluminum chloride are added, and the mixture is stirred for 20 minutes at the same temperature. The reaction product is washed with water, then with 20% sodium hydroxide solution, and again with water. Non-polymerized substances are recovered from the reaction product by stripping distillation in vacuo. The yield of resin is 27.7%, and the obtained resin has a softening point of 90° C., Gardner color of 1 and iodine value of 70.8. When aluminum chloride alone is employed as catalyst, the yield of resin is 21% and gelly substance formed is 6%.

*Example 2*

To 300 parts of a distillate from a steam cracking product, having boiling point of 50–185° C. and containing about 17% of conjugated acyclic diolefins, 5.0% of cyclopentadiene, 20% of olefins, 45% of aromatics and 13% of paraffins, 1.5 parts of tin tetrachloride are added under efficient stirring at 5° C. The resultant mixture is stirred for 15 minutes, whereupon into the mixture, 1.5 parts of powdered anhydrous aluminum chloride (n-hexane solution) are poured, and the resultant solution is stirred for another 30 minutes. The reaction product is washed three times with hot water, with 20% sodium hydroxide solution, then with 0.2% oxalic acid solution (250 cc.×2)

and again with water. It is then subjected to stripping as in Example 1. The yield of resin is 22%, and the obtained resin has softening point of 88° C., Gardner color of 2, and iodine value of 75.5.

*Example 3*

The naptha fraction of Example 2 is employed as the starting material. To 300 parts of the fraction, 3 parts of titanium tetrachloride are added under good stirring at 5° C. The resultant mixture is stirred for about 5 minutes, to which 3 parts of powdered anhydrous aluminum chloride are added. The resultant mixture is stirred well for another 25 minutes and then treated as in the foregoing examples. A resin, which has softening point of 80° C. and Gardner color of 2, is obtained in 20% yield.

*Example 4*

The same procedure as Example 1 is repeated, using, however, 3 parts of zirconium tetrachloride instead of tin tetrachloride. A resin is obtained in 18% yield, along with 3% of gelly substance. If aluminum chloride alone is employed, the gelly substance formed is 8%.

*Example 5*

The same procedure as Example 1 is repeated, using, however, 3 parts of germanium tetrachloride instead of tin chloride. A resin is obtained in 21.6% yield, along with 2% of gelly substance.

What we claim is:

1. A method for the production of petroleum resin which comprises contacting a petroleum fraction having a boiling point of about 40–185° C. and comprising olefinic, diolefinic, paraffinic hydrocarbons including cyclopentadiene, said hydrocarbons containing at least four carbon atoms, which petroleum fraction is the product obtained by steam cracking of a petroleum fraction selected from the group consisting of naphtha, kerosene and gas oil at a temperature of 500° C. to 1000° C. under a comparatively low pressure in the presence of steam for a short period of time, followed by the removal of hydrocarbons having less than four carbon atoms, with at least one tetrachloride of tin, titanium, zirconium, germanium or hafnium in an amount of 0.005–2.0 percent (wt.) at a temperature of −40° C. to 70° C. for a few minutes up to about thirty minutes, thereby producing preliminary polymerization, then contacting the reaction product with aluminum trihalide in an amount of 0.5–2.0 percent (wt.) at a temperature of −40° C. to 70° C. for about ten minutes to several hours, thereby producing further polymerization, and separating the produced resin from the reaction product.

2. Method as claimed in claim 1, wherein following polymerization the catalysts are removed from the reaction product by washing with an aqueous solvent and a chelating agent solution and thereafter hydrocarbon fraction is removed by distillation to obtain the resin.

3. A method as claimed in claim 2, in which said chelating agent is oxalic acid.

References Cited by the Examiner

UNITED STATES PATENTS

| | | | |
|---|---|---|---|
| 2,773,051 | 12/1956 | Leary | 260—683.15 |
| 2,867,643 | 10/1956 | Hanprecht et al. | 260—94.9 |

FOREIGN PATENTS

| | | |
|---|---|---|
| 543,596 | 7/1957 | Canada. |
| 777,051 | 1/1957 | Great Britain. |
| 784,938 | 10/1957 | Great Britain. |

JOSEPH L. SCHOFER, *Primary Examiner.*

LEON J. BERCOVITZ, *Examiner.*

H. P. HENDRICKSON, J. A. SEIDLECK,
*Assistant Examiners.*